(12) United States Patent
Kubrak

(10) Patent No.: US 9,423,502 B2
(45) Date of Patent: Aug. 23, 2016

(54) PSEUDOLITE POSITIONING SYSTEM

(75) Inventor: Damien Kubrak, Toulouse (FR)

(73) Assignee: Thales, Courbevoie (FR)

( * ) Notice: Subject to any disclaimer, the term of this patent is extended or adjusted under 35 U.S.C. 154(b) by 871 days.

(21) Appl. No.: 13/695,045

(22) PCT Filed: Apr. 18, 2011

(86) PCT No.: PCT/EP2011/056131
§ 371 (c)(1),
(2), (4) Date: Dec. 16, 2012

(87) PCT Pub. No.: WO2011/134821
PCT Pub. Date: Nov. 3, 2011

(65) Prior Publication Data
US 2013/0201057 A1    Aug. 8, 2013

(30) Foreign Application Priority Data

Apr. 30, 2010  (FR) ...................................... 10 01868

(51) Int. Cl.
*G01S 19/11*  (2010.01)
(52) U.S. Cl.
CPC ...................................... *G01S 19/11* (2013.01)

(58) Field of Classification Search
CPC ....................................................... G01S 19/11
USPC .................................................... 342/357.48
See application file for complete search history.

(56) References Cited

U.S. PATENT DOCUMENTS 7,916,074 B2\* 3/2011 Mathews ................ G01S 5/021
                                                         342/357.48

FOREIGN PATENT DOCUMENTS

JP          2010-114771          5/2010

\* cited by examiner

*Primary Examiner* — Frank J McGue
(74) *Attorney, Agent, or Firm* — Baker & Hostetler LLP

(57) ABSTRACT

A positioning system comprises a set of pseudolites distributed in a confined area, said pseudolites transmitting positioning signals characterized by their time desynchronization and their apparent Doppler frequency, said time desynchronization and/or said apparent Doppler frequency of the positioning signals transmitted by the pseudolites being configured so that there is no ambiguity concerning the location of the correlation peaks P1, P2, P3, P4, P5 in the matrix of ambiguities defined by the delay and the apparent Doppler frequency of the positioning signals acquired by the receiver.

5 Claims, 2 Drawing Sheets

PSEUDOLITE POSITIONING SYSTEM

CROSS-REFERENCE TO RELATED APPLICATIONS

This application is a National Stage of International patent application PCT/EP2011/056131, filed on Apr. 18, 2011, which claims priority to foreign French patent application No. FR 1001868, filed on Apr. 30, 2010, the disclosures of which are incorporated by reference in their entirety.

FIELD OF THE INVENTION

The present invention relates to a system allowing an object fitted with a suitable receiver to determine its position in a "confined" area.

More particularly, the positioning system according to the present invention is based on the use of pseudolites.

BACKGROUND

As is known, pseudolites, a contraction of pseudo-satellites, are devices operating according to the same principles as satellites belonging to constellations of satellites used in the context of global navigation satellite systems, known by the acronym GNSS, for Global Navigation Satellite System, such as the GPS system, for Global Positioning System, or the Galileo system. Unlike satellites, pseudolites are deployed on the ground. They can be distributed in a building and, in general, in "confined" areas.

In a pseudolite positioning system, said pseudolites transmit positioning signals of which the format is identical or similar to that of the messages transmitted by the satellites of a satellite navigation system. These positioning signals are notably characterized by their time desynchronization and by their frequency desynchronization, or apparent Doppler frequency, at the receiver. In this context, each pseudolite is usually allocated an identifier of the same family as that of a satellite. In the context of constellations of satellites, these identifiers are called spreading codes as is known to those skilled in the art.

The range of the signals transmitted by the pseudolites is variable; it depends on their power and on their use. Objects fitted with suitable receivers can acquire these positioning signals. As for a conventional satellite navigation system, a computation of pseudo-distances between said receiver and the pseudolites of which it has acquired the signals, followed by a computation of position by triangulation, make it possible to determine the location of the receiver. The principle of positioning by triangulation is known: it involves determining the position of a receiver as being at the intersection of spheres of centre the transmitters and of radius the distance between receiver and transmitters. The computations can be made on board, by the object itself, or remotely by a computer.

As has been seen, the pseudolite positioning systems are usually deployed in areas known as "confined". These confined areas may be buildings inside which the positioning signals transmitted by satellites in orbit around the Earth cannot be acquired because of the masking produced by the walls, the ceilings etc. They may simply be areas not covered by the satellite navigation system in question. Generally, a confined area will be defined as being an area in which positioning signals transmitted by satellites cannot be correctly acquired. On the other hand, "open areas" are spoken of in the areas in which positioning signals transmitted by satellites can be acquired by an appropriate receiver. Moreover, the satellites of which a receiver can theoretically receive positioning signals, because of the adequate relative position between said satellites and said receiver, are called "visible" to the receiver, while the other satellites of the constellation are called "not visible". These dedicated terms, "visible" and "not visible", can be used in the case of pseudolites, the appropriateness of the relative positions being in this case determined not by the geometry of the globe of the Earth, but by the local maskings that may affect the pseudolite signals.

The definitions given above of the terms "confined area", "open area", "visible" satellite or pseudolite and "non-visible" satellite or pseudolite are valid for all of the rest of the description and for the claims. European Patent Application EP 1742080 is representative of this state of the art.

A known problem that is inherent in pseudolite positioning relates to the fact that the transition from a confined area, in which the position of an object fitted with a receiver is computed by virtue of the positioning signals transmitted by pseudolites to an open area in which the positioning signals that are used are transmitted by satellites of a GNSS, must be transparent to the receiver. The known pseudolite positioning systems therefore require the receivers to constantly seek to acquire positioning signals over all of their channels. A certain number of channels is dedicated to the acquisition of positioning signals transmitted by visible satellites; these channels are associated with the spreading codes corresponding to said visible satellites. Other channels are associated with the spreading codes of the pseudolites of the confined area in which or close to which the object is found. In general, all of the available channels of the receivers are dedicated to the search for positioning signals to be acquired.

One embodiment of the present invention makes it possible to solve this problem, by making it possible to dedicate only one channel to the acquisition of signals transmitted by pseudolites.

But moreover, the main problem that is associated with pseudolite positioning systems and that the present invention makes it possible to solve is associated with interference of the positioning signals transmitted by the satellites of the GNSSs on which said pseudolite positioning systems are based.

Specifically, this problem, known as the "near-far" problem, arises from the fact that the positioning signals transmitted by the pseudolites have a power that is generally much greater than that of the signals transmitted by satellites. Thus, a user situated close to a confined area is likely to receive a positioning signal transmitted by a pseudolite of the confined area with a power of the order of 50 times that of the signals of the satellites of the GNSS that are intended to allow him to compute his position. In this case, the signal of the pseudolite "drowns out" the signals of the satellites and disrupts or prevents the correct positioning of the user. Major problems may arise, notably in the matter of safety in the civil aviation field.

In order to attempt to solve this problem, known solutions consist in optimizing the processing of the signals received by the receiver with the aid of appropriate processes within the receiver. However, these known solutions are not satisfactory because they involve increased consumption of energy and processing time for the receiver. Moreover, said receiver must be specifically adapted, which represents a considerable constraint for the users.

SUMMARY OF THE INVENTION

One object of the invention is notably to alleviate the aforementioned drawbacks. In order to solve the "near-far"

problem explained above, one embodiment of the present invention comprises means for controlling the time desynchronization and the apparent Doppler frequency of the signals transmitted by the pseudolites of the pseudolite positioning system according to the invention so that the signals transmitted by the pseudolites cannot "drown out" the signals originating from GNSS satellites.

More precisely, the subject of the invention is a system for positioning an object in an area of interest having a confined area, said system comprising a set of pseudolites distributed in the confined area, said pseudolites having a spreading code corresponding to the spreading code of a satellite belonging to a constellation of satellites of a satellite navigation system, and transmitting positioning signals characterized by their time desynchronization and their apparent Doppler frequency, and said object comprising a receiver capable of acquiring the positioning signals. In the system according to the invention, said time desynchronization and/or said apparent Doppler frequency of the positioning signals transmitted by the pseudolites are configured so that there is no ambiguity concerning the location of the correlation peaks in the matrix of ambiguities defined by the delay and the apparent Doppler frequency of the positioning signals acquired by the receiver.

Advantageously, the system according to the invention comprises a server comprising means for controlling the time desynchronization and/or the apparent Doppler frequency of the positioning signals transmitted by the pseudolites.

Advantageously, said server also comprises means for controlling the power of the positioning signals transmitted by the pseudolites.

Advantageously, the time desynchronization and the apparent Doppler frequency of the positioning signals transmitted by the pseudolites are first programmed at each pseudolite.

According to one embodiment, all the pseudolites have the same spreading code.

The receiver comprising a number of channels greater than 1 for the search and acquisition of positioning signals, said receiver can advantageously dedicate only one channel to the search for positioning signals transmitted by the pseudolites.

According to one embodiment, the positioning signals transmitted by the pseudolites have frequencies belonging to a range of frequencies with no intersection with the range of frequencies used to transmit positioning signals by the satellites belonging to the constellation of satellites of the satellite navigation system in question.

BRIEF DESCRIPTION OF THE DRAWINGS

Other features and advantages of the invention will appear with the aid of the following description made with respect to the diagram of FIG. 1 appended which represents a matrix of ambiguities defined by the delay and the apparent Doppler frequency of the positioning signals acquired by the receiver.

DETAILED DESCRIPTION

Figure 1:
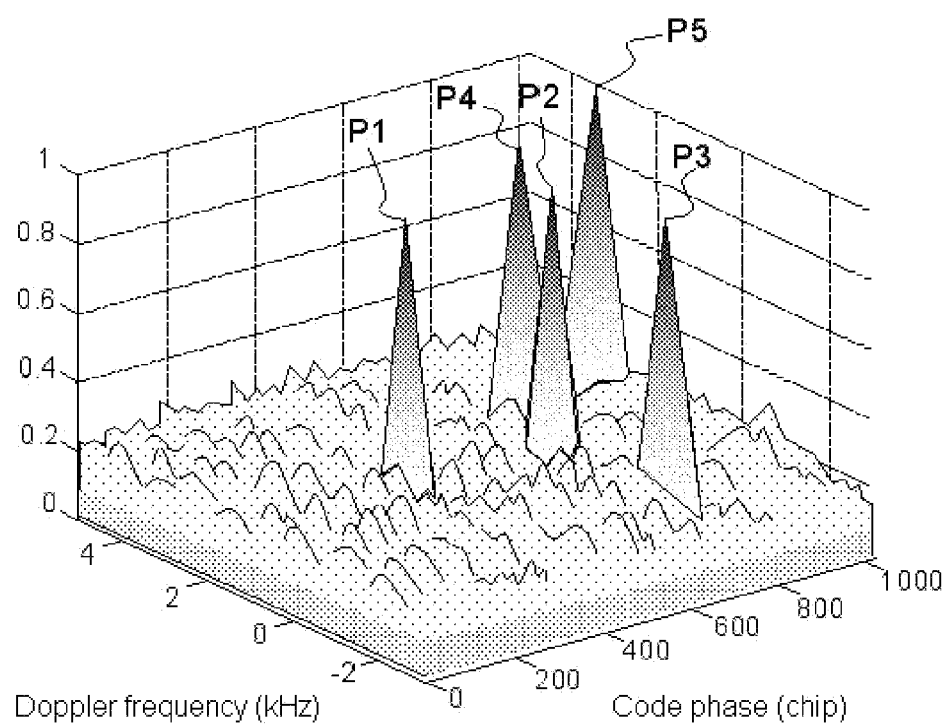
Figure 2:
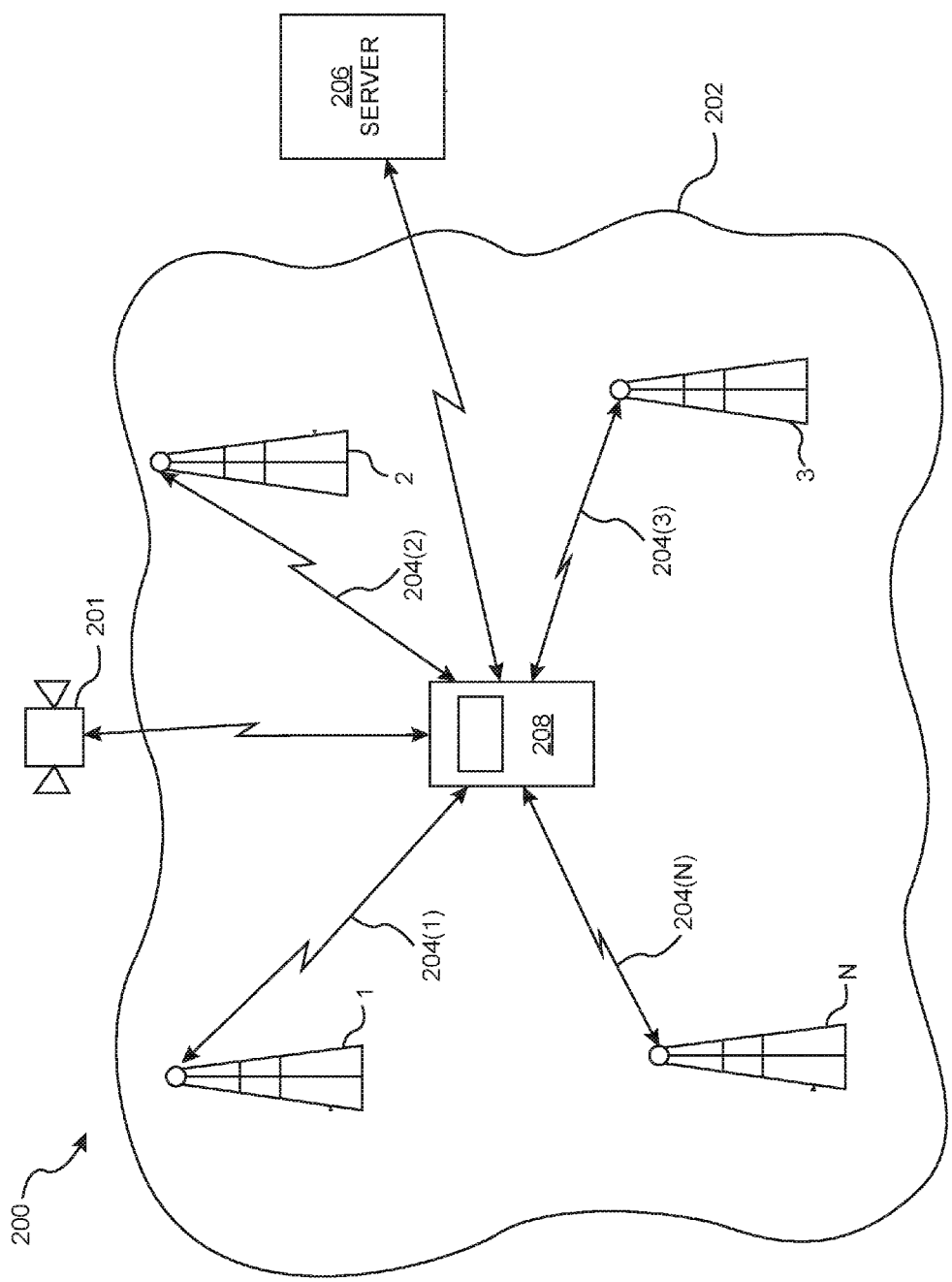

FIG. 1 illustrates the characterizing portion of Claim 1. FIG. 2 illustrates a set of pseudolites and a satellite communicating with an object in a pseudolite positioning system.

A matrix of ambiguities is defined as the matrix that assembles the matrices of acquisition of the various signals, with as its axes the propagation delay—or code phase—and the Doppler frequency. FIG. 1 is therefore a representation of a matrix of ambiguities. A correlation peak P1, P2, P3, P4, P5 corresponds to a peak that can be observed on an acquisition matrix.

Therefore, in the pseudolite positioning system 200 according to the invention, N pseudolites 1-N, N being greater than or equal to 2, are deployed in a confined area 202. The system 200 also comprises means capable of configuring the characteristic of the positioning signals 204(1)-204(N) that said pseudolites 1-N transmit. In the main embodiment of the invention, the configuration of the positioning signals 204(1)-204(N) transmitted by the pseudolites 1-N is carried out at a distance by a server 206. Alternatively, the configuration may consist in a prior programming of all of the pseudolites 1-N.

The characteristic of the positioning signals 204(1)-204(N) comprises their transmission power, their time desynchronization and their frequency desynchronization. The configuration of the frequency desynchronization makes it possible to confer on the positioning signals 204(1)-204(N) an apparent Doppler frequency from the point of view of the receiver 208.

In order to apply the invention, it is necessary to control at least the time desynchronization or the frequency desynchronization of the positioning signals 204(1)-204(N).

The principle of the invention therefore consists in configuring at least the time desynchronization or the frequency desynchronization of the positioning signals 204(1)-204(N) transmitted by the pseudolites 1-N, or both, so that, in the matrix of ambiguities defined by the delay/the time desynchronization and the apparent Doppler frequency of the positioning signals 204(1)-204(N) acquired by the receiver 208, there is no ambiguity on the location of the correlation peaks P1, P2, P3, P4, P5 as shown in FIG. 1. This is made possible by the offset in the frequency and/or time desynchronizations of the various positioning signals 204(1)-204(N) transmitted by the various pseudolites 1-N and acquired by the receiver 208.

Thus, by an appropriate configuration of the characteristic of the positioning signals 204(1)-204(N) transmitted by the pseudolites 1-N, it is possible to solve the "near-far" problem mentioned above. Specifically, the receiver 208 that has acquired a set of positioning signals 204(1)-204(N) can discriminate between said positioning signals 204(1)-204(N) by an analysis of the matrix of ambiguities described above. Specifically, each correlation peak P1, P2, P3, P4, P5 corresponding to a positioning signal in the positioning signals 204(1)-204(N) acquired by the receiver 208 is clearly located; its content can therefore be processed without it having been scrambled by any of the other positioning signals 204(2)-204(N) that are received.

Moreover, if it knows the position of the various pseudolites 1-N in the confined area, the receiver 208 may, once the correlation peaks P1, P2, P3, P4, P5 have been located, allocate each correlation peak to an identified pseudolite in the set of pseudolites 1-N. It is consequently possible to use a single spreading code for all of the pseudolites 1-N, which provides the advantage of releasing processing channels of the receiver 208. Moreover, this makes it easier to search for positioning signals 204(1)-204(N) from pseudolites 1-N since the receiver 208 needs to scan only one channel. Finally, since only one channel of the receiver 208 is used, a function of the "snapshot" type, consisting in rapidly determining the position of the object comprising the receiver 208 in question, is also made easier and saves battery, for the same reason.

Moreover, in order to improve the performance of the system 200, it is possible to choose frequencies for the transmission of positioning signals 204(1)-204(N) transmitted by pseudolites 1-N without intersection with the frequency range used by the satellites 201 of the GNSS in question. This makes it possible to minimize the risk of interference between the positioning signals 204(1)-204(N) transmitted by the pseudolites 1-N and those transmitted by the satellites 201 of the corresponding GNSS.

Finally, according to a preferred embodiment of the invention, the pseudolite positioning system 200 also comprises means for controlling the transmission power of the positioning signals 204(1)-204(N) by the pseudolites 1-N. The same server 206 as for the time desynchronization or the apparent Doppler frequency of the positioning signals 204(1)-204(N) can, if necessary, be programmed to configure individually said transmission power of the positioning signals 204(1)-204(N). In this way, it is possible to ensure that the positioning signals 204(1)-204(N) originating from the pseudolites 1-N will not "drown out" the signals originating from satellites 201, and to yet more securely solve the "near-far" problem described above.

In summary, the main advantage of the invention is to propose a solution to the "near-far" problem concerning pseudolite positioning systems.

The other important advantages of the present invention relate to positioning with the aid of a single code and the reduction of power consumption.

The invention claimed is:

1. A system for positioning an object in an area of interest having a confined area, said system comprising:
   a set of pseudolites distributed in the confined area, each pseudolite in said set of pseudolites having a spreading code corresponding to a spreading code of a satellite belonging to a constellation of satellites of a satellite navigation system, and each pseudolite being configured to transmit positioning signals characterized by a time desynchronization and an apparent Doppler frequency of the positioning signals, and said object comprising a receiver capable of acquiring the positioning signals, said system further comprising:
   a server configured to determine said time desynchronization and/or said apparent Doppler frequency of the positioning signals transmitted by each pseudolite in the set of pseudolites so that there is no ambiguity concerning a location of correlation peaks in a matrix of ambiguities defined by the time desynchronization and the apparent Doppler frequency of the positioning signals acquired by the receiver, said no ambiguity in the location of correlation peaks being provided by the server by an offset in apparent Doppler frequency and/or the time desynchronization of the positioning signals.

2. The system as claimed in claim 1, wherein the time desynchronization and the apparent Doppler frequency of the positioning signals transmitted by the set of pseudolites are first programmed at each pseudolite.

3. The system as claimed in claim 1, wherein all pseudolites in the set of pseudolites have a same spreading code.

4. The system as claimed in claim 3, wherein the receiver comprises a number of channels greater than 1 for a search and said acquiring of the positioning signals, said receiver configured to dedicate only one channel to the search for the positioning signals transmitted by each pseudolite in the set of pseudolites.

5. The system as claimed in claim 1, wherein the positioning signals transmitted by each pseudolite in the set of pseudolites have frequencies belonging to a range of frequencies with no intersection with a range of frequencies used to transmit the positioning signals by the satellites belonging to the constellation of satellites of the satellite navigation system.

* * * * *